April 11, 1967   H. D. ARNOLD   3,313,965
SHADED POLE MOTOR
Filed Nov. 19, 1964
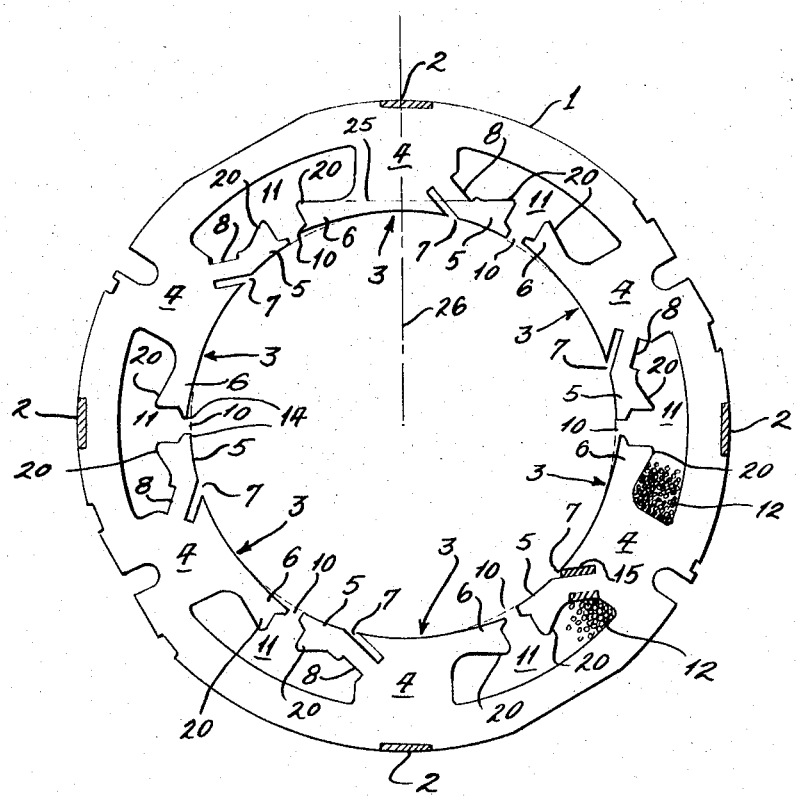
INVENTOR:
HAROLD D. ARNOLD
BY
ATTORNEY.

3,313,965
SHADED POLE MOTOR
Harold D. Arnold, Bellefontaine Neighbors, Mo., assignor to Emerson Electric Co., St. Louis, Mo., a corporation of Missouri
Filed Nov. 19, 1964, Ser. No. 412,382
5 Claims. (Cl. 310—172)

This invention relates to shaded pole induction motors.

Shaded pole induction motors are used extensively, particularly in the small motor field. Such motors are distinguished by having a shading coil, generally formed of a single closed turn of highly conductive material, embracing a portion of each pole. The shading coil provides a phase displacement with respect to the main portion of the pole, which tends to produce a rotating field and thereby provides a starting torque for the motor.

One of the problems raised by conventional designs of shaded pole motors, in view of the fact that one of their virtues is supposed to be their cheapness, is the complication and relatively high cost of the means needed to keep stator coils and end wires out of the inner periphery of the bore. The use of integral insulation on salient pole type stator laminations such as the shaded pole motor, permits the end turns to be wound directly on the core. However, to retain the end turns and to keep them out of the inner periphery of the bore, it is common practice to use a coil pin. This pin is normally parallel to the axis of the rotor, located in the stator pole approximately in the center and as close to the inside face of the stator pole as possible. It is necessary that these pins be non-magnetic and that they be able to stand the temperatures reached during the insulating process. The pins commonly used are made of impregnated fiberglass. These are relatively expensive, and, when used on an inexpensive motor, amount to a considerable percentage of the total cost of the motor. In the case of the end wire connections, it has been found necessary in conventional shaded pole motors to use a string tie to ensure that the connections stay in place. There has been a long standing need for a new type of stator lamination which will allow the full exploitation of the capabilities of the epoxy-type insulating coating now in use.

One of the objects of this invention is to eliminate coil pins, with their added cost, from shaded pole motors, without sacrificing motor efficiency.

Another object of this invention is to eliminate the string ties on the end wire connections, with their added cost, without sacrificing motor efficiency.

Another object of this invention is to provide a stator which is amenable to the simplification or elimination of conventional winding forms normally required during winding operations.

Another object of this invention is to accomplish all of the aforementioned objects while maintaining approximately the same pole to pole leakage reactance as in conventional designs.

Another object of this invention is to accomplish all of the aforementioned objects without sacrificing motor efficiency or performance and without increasing the size of the motor.

In accordance with this invention, generally stated, a stator is provided with poles of such construction as to retain the wire of the coil during and after winding without the use of coil pins. The pole tips maintain a conventional level of pole to pole leakage reactance. To this end, pole tips are provided with wedge-shaped lips which flare outwardly circumferentially from the center of the pole with respect to the bore of the stator, though they are substantially tangential to a radius of a circle concentric with the stator bore axis. The lips are offset circumferentially a short distance from the facing ends of the tips. Projecting noses at the circumferential ends of the pole tips define gaps between successive poles, and are so constructed as to maintain the conventional level of pole to pole leakage reactance. The lips define with the center area of the pole a somewhat J-shaped cavity within which the winding is seated. The lips constitute the sole means for positively holding the winding, which is wound directly on the center area of the poles, against radially inward movement.

In the drawing, the figure is a sectional view, taken in a plane perpendicular to the central axis, of one embodiment of stator constructed in accordance with this invention, partially wound.

Referring now to the figure of the drawing for one illustrative embodiment of this invention, reference numeral 1 indicates a stator of a six pole, shaded pole motor. The stator 1 is coated with an insulating material, such as an epoxy resin, not here shown, before it is wound. A rotor, not here shown, is mounted concentrically within the stator, and is of standard construction, with conductor bars shorted on each other, as by an integrally cast end ring.

The stator is preferably made up of a number of laminations of magnetic material, one of which is shown in plan in the figure, held together, in this embodiment, by clamps 2. The laminations may be held together in any other suitable way.

The stator 1 has six poles 3. Each of the poles 3 is made up of a center pole area 4, a shaded pole tip 5, and an unshaded pole tip 6. The shaded pole tip 5 is separated through part of its length from the center pole area 4 by a slot 7. In this embodiment, the shaded pole tip is notched on its outer side to provide a channel 8. A conventional shading coil 15, of solid copper or other highly conductive material, lying in the slot 7 and the channel 8, embraces the shaded pole tip 5. The term "shading coil" is used herein to embrace both a shading coil with a single turn and a shading coil with a plurality of turns.

Each of the poles 3 is separated from its immediately adjacent poles by a gap 10, defined by noses 14. Each gap 10 leads into an open area 11, which accommodates a main, running, winding 12, a portion of which is shown. The main winding 12, which embraces the pole 3, may be a conventional running winding, but wound directly on the center pole area of the poles.

Both the shaded pole tip 5 and the unshaded pole tip 6 of each pole are provided with a lip 20 which, with respect to the bore of the stator, flares radially outwardly in a wedge shape from the center pole area. As can be seen by the dashed lines 25, however, the radially outermost edge of the lips 20 lies substantially along a perpendicular to a radius 26 through the circumferential center of center pole area 4.

The lips 20 stop short of the circumferential ends of the pole tips, and the noses 14 project circumferentially therebeyond. In the preferred embodiment shown, the ends of the lips are defined by radial surfaces and the noses project beyond the ends of the lips a distance of one half the circumferential width of the gap. It will also be observed that, in the embodiment shown, the radial width of the nose on the unshaded tip 6 is less than the radial width of the nose on the shaded tip 5, because the faces of the poles do not define a circular bore. This is because the circumferential ends of the pole tips are faced radially outwardly slightly, to provide better flux distribution, but this is not a part of the present invention per se.

Merely by way of illustration and not by way of limitation, in a commercial six pole "5 inch" motor (approximately 4.79 inch O.D. lamination), the radially outermost surfaces of the lips lie for most of their length and at their circumferentially outer ends on a tangent to a point on a line running through the center of the pole, defining a radius of 1.621 inches, while the radius of the stator bore along that same radius line is approximately 1.525 inches. As has been pointed out above, the poles' radially inner faces do not define a circular bore, being in the commercial embodiment here described on compound radii which produce an outward displacement of the shaded tip 5 of .0157 inch and of the unshaded tip 6 of .0377 inch from the reference radius of 1.525 inches. This makes the nose at the shaded end radially wider than the nose at the unshaded end, because the lip is the same at both ends. In this illustration, the center pole area is .718 inch wide. The center to center distance between gaps, measured along a line perpendicular to the radial line through the center between the gaps, is about 1.35 inches and the gaps are 1.25 inches wide. The noses project circumferentially beyond the radial edge which defines the circumferential end of the lips .0625 inch, i.e., half the gap spacing.

It is one of the great advantages of the stator of this invention that it is amenable to many modifications to fit specific needs. The stator, for example, may have either more or less than six poles. The inner bore of the stator may either be constructed in a circular configuration, or may be constructed with any number of different configurations so as to provide a multitude of air gap configurations between the stator bore and the rotor. The laminations can, in effect, be turned over as compared with the lamination shown in the drawing, so that, moving clockwise, the shaded pole tips 5 lead instead of following, to make the motor run in the opposite direction from the one shown in the drawing, or wound shading coils, selectively energizable, can be provided in both pole tips to make the motor reversible.

Numerous other variations in the construction of the stator of this invention, within the scope of the appended claims, will occur to those skilled in the art in the light of the foregoing disclosure.

Having thus described the invention, what is claimed and desired to be secured by Letters Patent is:

1. In a shaded pole motor, the improvement comprising an integrally insulated stator having a plurality of poles with shading coils, each of said poles having a center pole area and oppositely circumferentially directed tip sections integral with said center pole area, each of said tip sections having a nose projecting circumferentially to define with a nose of an adjacent pole a gap, and circumferentially inboard and radially outboard of the nose with respect to the center pole area, a lip, flaring, with respect to the stator bore, radially outwardly from the center pole section toward the nose, said lip and said center pole area defining between them a J-shaped winding-receiving area; and running winding wound directly on and embracing said center pole area, said lips serving as the sole means for positively holding said winding against radially inward movement.

2. The motor of claim 1 wherein the lips have a radially outermost surface which lies substantially along a tangent to a circle with its center on the stator bore axis and its radius through the center of the center pole area.

3. The motor of claim 1 wherein the circumferential projection of the nose beyond the lip is equal to one half the circumferential width of the gap.

4. The motor of claim 1 wherein the lips on the two tips of each pole are identical.

5. The motor of claim 4 wherein one of the tips carries a shading coil and the other does not, and the nose on the shaded tip is radially wider than the nose on the unshaded tip.

References Cited by the Examiner
UNITED STATES PATENTS

| | | | |
|---|---|---|---|
| 2,810,845 | 10/1957 | Howes | 310—172 |
| 2,845,553 | 7/1958 | Oldenkamp et al. | 310—172 |

MILTON O. HIRSHFIELD, *Primary Examiner.*

L. L. SMITH, *Assistant Examiner.*